United States Patent [19]

Fassler

[11] Patent Number: 5,201,501
[45] Date of Patent: Apr. 13, 1993

[54] UNIT FOR GRASPING AND CLAMPING CIRCULAR OBJECTS

[75] Inventor: Georges Fassler, Charenton le Pont, France

[73] Assignee: Essilor International Compagnie Generale d'Optique, Creteil Cedex, France

[21] Appl. No.: 833,875

[22] Filed: Feb. 11, 1992

[30] Foreign Application Priority Data

Feb. 18, 1991 [FR] France .................... 91 01898

[51] Int. Cl.[5] .............................. B23Q 3/08
[52] U.S. Cl. ........................ 269/32; 269/24; 269/34; 269/35; 269/156
[58] Field of Search ............ 269/24, 25, 27, 32, 269/34, 35, 126, 154, 156, 254 CS

[56] References Cited

U.S. PATENT DOCUMENTS

| | | | |
|---|---|---|---|
| 2,160,378 | 5/1939 | Balsiger | 51/238 |
| 2,914,026 | 11/1959 | Greenwood | 269/126 |
| 3,595,557 | 7/1971 | Daniels | 269/32 |
| 4,294,444 | 10/1981 | Horton | 269/32 |
| 4,484,775 | 11/1984 | Norkus | 269/27 |
| 4,877,228 | 10/1989 | Ripert | 269/156 |

FOREIGN PATENT DOCUMENTS

| | | | |
|---|---|---|---|
| 8623648 | 9/1986 | Fed. Rep. of Germany . | |
| 0035628 | 2/1984 | Japan | 269/32 |
| 2089707 | 6/1982 | United Kingdom . | |

Primary Examiner—J. J. Swann
Attorney, Agent, or Firm—Pennie & Edmonds

[57] ABSTRACT

A unit is provided for grasping and clamping generally circular shaped parts such as lenses, comprising a central body on which three grasping and clamping elements are mounted adapted to bear tangentially on said part at three points or regions of tangential contact forming, pairwise, angles greater than 90°, one of the grasping and clamping elements being arranged to lie on the axis of said central body at one end of a movable central push rod, the other two said elements being arranged symmetrically with respect to said axis at the distal end of two levers, the push rod being urged by at least one clamping spring in the axial clamping direction, and the other two elements being urged to rotate in the direction of clamping by at least one lever-action producing spring, release of clamping being obtained by application of fluid pressure to a piston adapted to operate in opposition to said clamping spring.

10 Claims, 3 Drawing Sheets

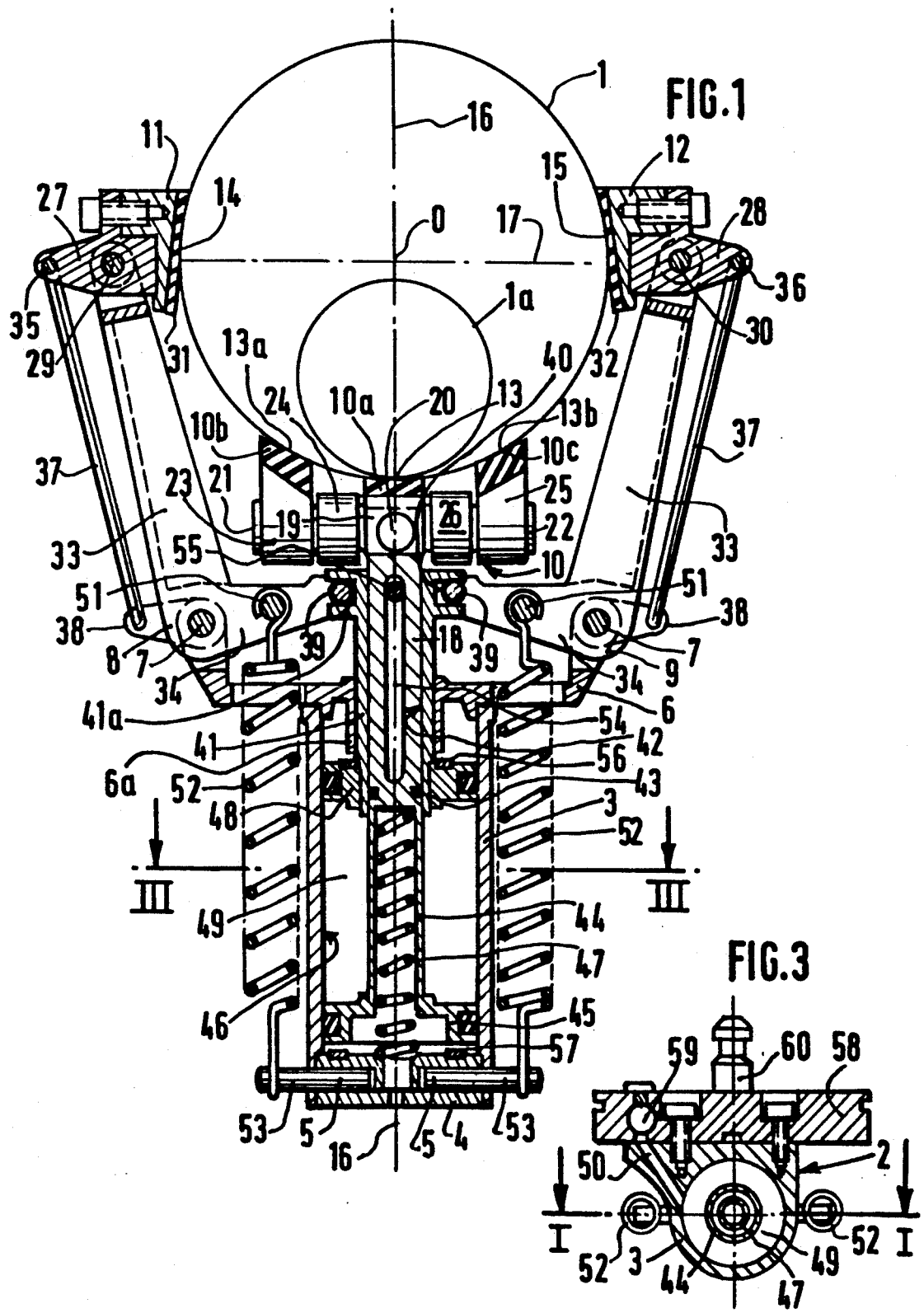

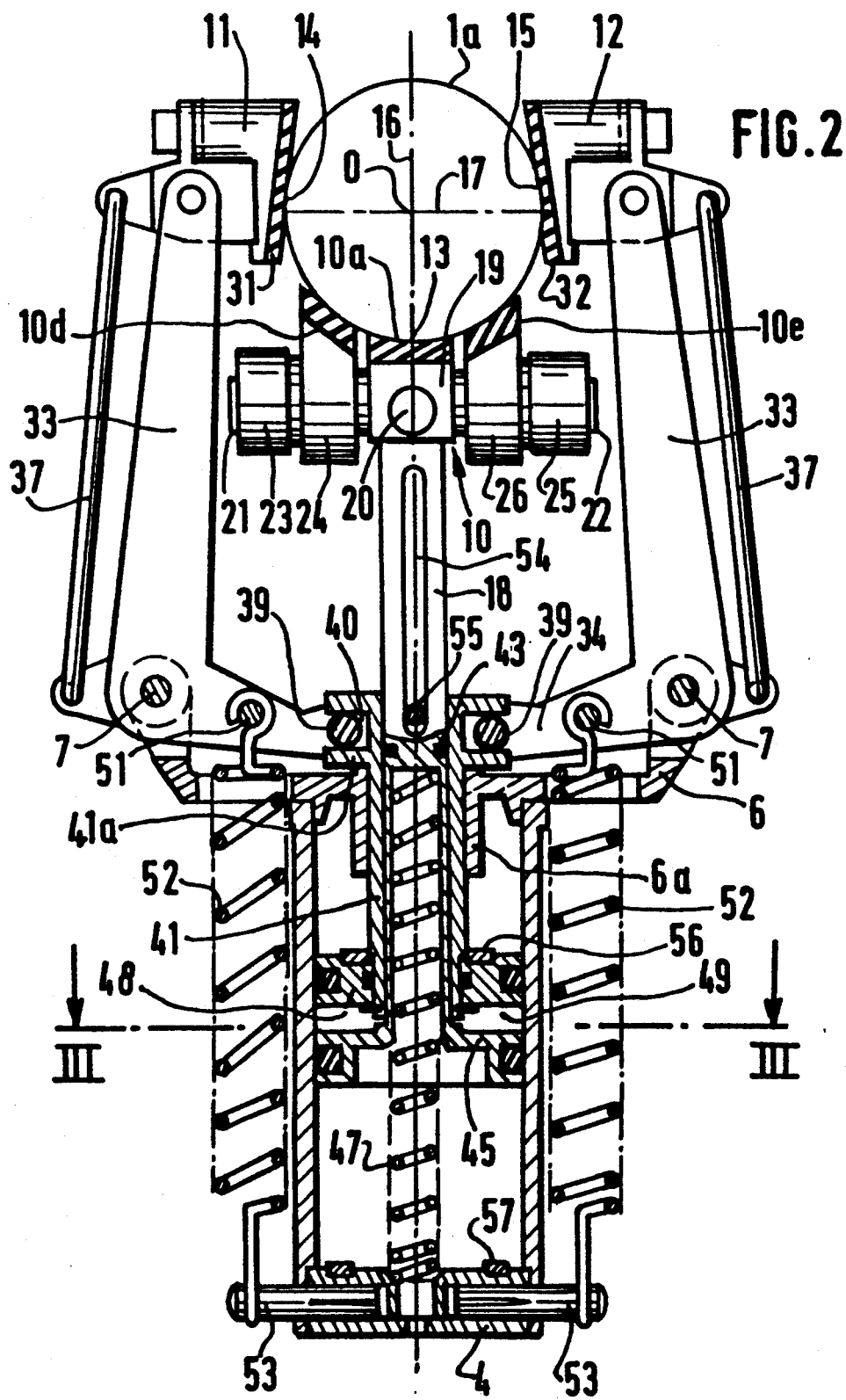

UNIT FOR GRASPING AND CLAMPING CIRCULAR OBJECTS

BACKGROUND OF THE INVENTION

The present invention relates to a unit for grasping and clamping a generally circular shaped part, comprising a central body on which three grasping and clamping elements are mounted adapted to bear tangentially on said part at three points or regions of tangential contact forming, pairwise, angles greater than 90°, one of the grasping and clamping elements being arranged to lie on the axis of said central body at one end of a movable central push rod, the other two said elements being arranged symmetrically with respect to said axis at the distal end of two levers each consisting of a clamping arm and an operating rod, each one of said levers being pivoted by the associated ends of said arm on a support shaft of said central body.

Units suitable for grasping parts are being used more and more for industrial robots and in the majority of cases consist of simple pincer-like grasping elements the jaws of which firmly clamp a strong metal part, by application of fluid pressure. An example of a grasping and clamping unit for a circular part is provided, for instance, in British Patent GB-A-2 089 707. In this document, a central body carries a central push rod and two rotatable levers, these three elements being actuated simultaneously by an axial fluid cylinder, during both clamping and release.

Known grasping and clamping devices are generally designed to handle metal parts requiring machining which are strong and to which significant clamping forces can be applied, ensuring that the workpieces to be manipulated are held firmly. When it is envisaged to handle disk-shaped parts, such as spectacle lenses in a fragile and brittle material, experience shows that known pincer-like clamping devices and grasping units are generally not satisfactory. They notably suffer from a risk of the part being accidentally dropped should there be an unintentional release of clamping fluid pressure. Moreover, they do not always enable the part to be correctly centered at the moment it is grasped, meaning that there is a constant danger of the part tipping over and becoming released.

One of the aims of the present invention is precisely that of providing a grasping unit which overcomes the above stated disadvantages and which further provides well-centered engagement of a disk-shaped part to be handled, together with permanent clamping action without the need to provide an external clamping force obtained for example by the use of fluid pressure, only unclamping or release being subject to the action of fluid pressure.

SUMMARY OF THE INVENTION

The present invention provides a grasping and clamping unit in which a push rod is urged by at least one clamping spring in the axial clamping direction, and in which the end of said push rod opposing the clamping element is associated with a first piston adapted to be actuated against said clamping spring, each operating arm being angled with respect to said clamping arm and being urged to rotate in the direction of clamping by at least one lever spring.

According to one feature of the grasping and clamping unit, the operating arms of said levers are each urged by a lever spring at a position that is intermediate between their support shaft and their free end which is engaged into a groove of an annular sleeve at least partially surrounding said push rod.

According to a further feature of the above said grasping and clamping unit, the end of said sleeve opposing said groove is associated with a second piston adapted to be actuated against said two lever springs. Thus, each one of the clamping arms is operated independently by its lever spring but the two arms are coupled by the annular sleeve which has the purpose of guiding the central push rod, the latter being adapted to move axially for permanently applying the circular part to be clamped into a position that is almost diametrical between the two clamping elements of the levers.

As each one of the grasping and clamping elements is operated, during clamping, by its own spring, the clamping elements become applied at successive points in time during clamping thus improving safe grasping of the part.

According to yet a further embodiment of the grasping and clamping unit, the reaction force of the two lever springs applied to the annular sleeve is distinctly greater than the reaction force of the clamping spring applied to the push rod. Such an arrangement enables the clamping arms to provide their effect before that of the clamping element carried by the push rod.

In accordance with a further feature the push rod is linked to the said first piston by a hollow rod member which at least partially houses said clamping spring consisting of a helical compression spring bearing at one of the ends thereof against the base of said central body and at the other end thereof on said push rod.

According to yet a further feature, the said annular sleeve carries a pin that engages in an axial groove of said central push rod.

According to still a further feature of the grasping and clamping unit according to the invention, each lever spring is a helical traction spring one end of which is engaged on said operating arm while the other end thereof is engaged on a projecting part of the base of said central body.

In one embodiment, the annular sleeve is provided with a cylindrical bore in which said push rod passing through said second piston is able to move in a sealed manner, said first and second pistons being provided in the same cylindrical bore of said central body, defining within said cylindrical bore between said two pistons and externally of said hollow rod, an annular fluid chamber adapted to be supplied with fluid under pressure to effect release of clamping. This compact arrangement makes it possible to provide two separate clamping release pistons, respectively for the central clamping element and for the clamping elements that are provided laterally on the levers, while only using one single bore and one single clamping-release chamber. The lateral clamping elements can thus be released after the central clamping element, with only one fluid chamber however being used, providing a very compact arrangement.

According to another feature, each free end of the clamping arms of the levers carries a shoe member covered with a plate of elastomer material adapted to bear tangentially against said part and pivoting at the end of said clamping arm.

According to still a further feature of the grasping and clamping unit according to the invention, each shoe member is pivoted at the end of a connecting rod the other end of which pivots on said central body, whereby an orientation of said shoe member can be determined for all positions of said clamping arm.

According to yet a further feature of the grasping and clamping unit according to the invention, the central clamping element, mounted at the end of said push rod, carries a pivoted central jaw on which, at each side thereof, at least one pair of jaws is mounted adapted to be moved to a position where said laws have no effect by rotation thereof with respect to said central jaw, the elastomer contact plates of the outermost of said jaws being arranged so as to come into tangential contact with large diameter parts to be grasped and the elastomer contact plates of the innermost jaws being adapted to come into tangential contact with small diameter parts to be grasped, whereby said central jaw and the outermost jaws become applied to large diameter parts, and said central jaw and the two innermost jaws become applied to small diameter parts.

Further aims, advantages and features of the invention will become more clear from the description that follows of a preferred embodiment provided by way of non-limiting example and with reference to the attached drawings.

BRIEF DESCRIPTION OF THE DRAWINGS

FIG. 1 shows an axial cross-section along line I—I of FIG. 3 of the grasping and clamping unit according to the invention applied to a large diameter cylindrical part;

FIG. 2 shows, in the same axial cross-section and on a slightly larger scale, the grasping and clamping device according to the invention applied to a small-diameter cylindrical part, the arms of the clamping elements being shown in a top view and not in cross-section;

FIG. 3 is a sectional view, on a smaller scale, taken along line III—III of FIGS. 1 and 2;

DETAILED DESCRIPTION OF PREFERRED EMBODIMENTS

Figure 4A:
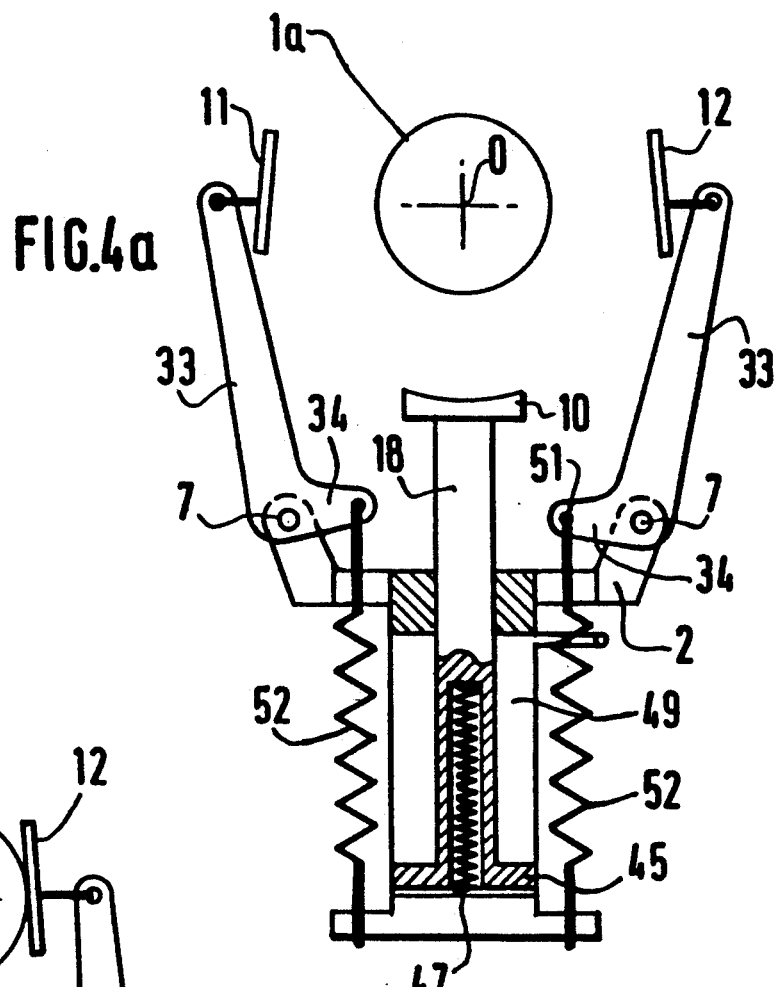
FIGS. 4a and 4b are a diagrammatical view of a simplified embodiment of the grasping and clamping device according to the invention, FIG. 4a corresponding to the open position and FIG. 4b to the closed position onto a small-diameter cylindrical part.

The grasping and clamping device, frequently referred to simply as a gripper, is designed to handle parts 1 of a generally circular or figure of revolution shape which, for example, take the form of transparent glass or plastics material disks that are to be machined for forming lenses or spectacle lenses. The clamping unit is made up of elements assembled onto a central body 2 taking the form of a cylinder 3 the rear base 4 of which has pins or keys 5 passing therethrough for mounting and engaging with traction springs. The forward base 6 of cylinder 3 carries, on external extensions thereof, shafts 7 forming a point of support for external twin arm rotatable levers 8 and 9.

Clamping of parts 1 or 1a is achieved using three clamping elements or jaws 10, 11, 12 each of which is adapted to bear tangentially on the part 1 or 1a at three tangent points or regions 13, 14, 15 where, pairwise, they form angles greater than 90° thus ensuring that the cylindrical contoured part 1 or 1a is locked in position between the clamping elements. It will be noted that if the longitudinal axis 16 of the central body and of cylinder 3 is traced and the diameter line 17 of part 1, which is perpendicular to this axis 16 and passes through the center 0 of part 1, the regions of tangency 14 and 15 fall slightly beyond the diameter line 17 with respect to central body 2. The result of this arrangement is that the part 1 or 1a can, thanks to the significant degree of adherence at the tangency regions 14 and 15, be held in position simply by means of the clamping elements 11 and 12 without being able to escape in the direction of clamping element 10. The position of the tangency regions 14 and 15 prevents the part 1 or 1a from, on the other hand, escaping in the outside direction and ensures that centering is established between clamping elements or jaws 11 and 12 regardless of the diameter of the part between a maximum value for part 1 and a minimum value for part 1a.

The clamping element 10 lies along the longitudinal axis 16 of the central body at the end of a push rod 18 and can carry several jaws which are shown viewed from their outside except for their elastomer contact pads 10a to 10e which are shown in cross-section. Central jaw 19 of clamping element 10 pivots on the push rod 18 via a pin 20 and carries laterally, friction-mounted on each side on a support pin 21, 22 transverse to pin 20, a set of two jaws, 23, 24 and 25, 26 respectively. The outer jaws 23, 25 fitted with elastomer contact pads 10b and 10c which are suitable for tangential engagement with large diameter parts 1, are employed for parts of large diameter while the inner jaws 24 and 26 fitted with elastomer contact pads 10d and 10e (see FIG. 2) designed to tangentially engage small-diameter parts folded over perpendicularly to the plane of the cross-section in FIG. 1, as shown in FIG. 1 where only the rear of the jaws can be seen. The inner jaws 24 and 26 are used for small diameter parts 1a the outer jaws 23 and 25 being folded over as shown in FIG. 2. A part 1 or 1a is thus optimally centered on the clamping element 10 despite the likelihood of the elastomer contact pads 10a to 10e being compressed to differing extents.

The clamping elements 11 and 12 are mounted on rotatable levers 8 and 9 forming a foot member 27, 28 which is pivoted by means of a pin 29, 30 on the free or distal end of the levers 8, 9. The clamping elements 11 and 12 carry, just like the jaws of element 10, elastomer contact pads 31, 32 for making contact with the part 1 or 1a. The levers 8 and 9 each carry a clamping arm 33 carrying, at its distal end, the clamping element 11 or 12 and an operating arm 34. The clamping arm and operating arm of each lever 8 and 9 are joined together at a junction forming the point of support for the levers 8 and 9 on the shaft 7. Each foot member 27 or 28 pivots at the end 35, 36 of a connecting rod 37 the other end of which pivots on an extension 38 of the forward base 6, thus pivoting on central body 2. When the levers 8 and 9 turn the position of foot member 27 or 28 is thus well controlled. Moreover, the foot members 27 and 28 and hence elastomer contact pads 31 and 32 fitted thereon have a greater inclination for large-diameter parts for which it is essential to provide enhanced axial retention.

The operating arms 34 of levers 8 and 9 are provided at their free or distal ends with a pin 39 engaged in a straight groove 40 of a sliding member in the form of an annular sleeve 41 surrounding push rod 18 and which is guided, while being movable axially, in a bearing 6a of the forward base 6 of cylinder 3. The pin 39 engaged in the groove 40 pivotally connects the distal ends of the operating arms 34 to the central body 2. Push rod 18 sealingly passes through a cylindrical passage 42 of sleeve 41 through the provision of an annular sealing ring 43 and is extended by a hollow rod 44 which is terminated by a first piston 45 which can move in a sealed manner in the inside passage 46 of cylinder 3. A helical compression spring 47, the majority of which is housed inside hollow rod 44, is fitted between base 4 of the cylinder 3 and push rod 18, at the base of hollow rod 44, and urges push rod 18 and hence clamping element 10 in the direction of clamping.

Annular sleeve 41 which moves sealingly around push rod 18 carries, at the end thereof opposing groove 40, a second piston 48 which can move in a sealed manner in the bore 46 of cylinder 3. The first piston 45 and the second piston 48 thus mutually define inside cylindrical bore 46 and externally of hollow rod 44, an annular fluid chamber 49. Fluid chamber 49 is adapted to be supplied with fluid under pressure, for example via compressed air via a channel 50 (see FIG. 3) which terminates laterally in the free space 49 between the two pistons when they are as close together as possible (see FIG. 2), in other words substantially in the plane of section III—III of FIGS. 1 and 2.

Each operating arm 34 of the levers 8 and 9 is angled almost at a right angle with respect to clamping arm 33 and carries, at about the half-way point between supporting shaft 7 and the end pin 39, a transverse pin 50 onto which the hooked end of a lever spring 52 engages, the spring taking the form of a helical traction spring. The other hooked end of lever spring 52 is engaged on the projecting lug of the assembly key 5 of the rear base 4 of cylinder 3.

Push rod 18 includes an axial groove 54 extending in the direction of the longitudinal axis 16 of the central body 2 and through which a rod or pin 55 carried by the forward end of annular sleeve 41 passes. It will moreover be noted that elastomer end-of-travel stops are provided for halting the travel of the pistons which move under the effect of the fluid pressure prevailing in chamber 49. An annular elastomer stop member 56 is arranged on the second piston 84 for coming into contact with the end of the bearing 6a of the forward base 6. An annular stop member 57 is provided on the rear base 4 of cylinder 3 for coming into contact with the first piston 45.

Turning now to FIG. 3, it will be seen that the cylinder body 3 forming the central body 2 is bolted onto a base plate 58 carrying an axial channel 59 for supplying fluid under pressure to fluid chamber 49 via a lateral channel 50. Base plate 58 is integral with a locking rod 60. This locking rod 60 which is provided with a circular locking groove is arranged perpendicularly to the axis of cylinder 3 and has the purpose of fastening the grasping unit onto an operating arm which is not shown.

The operation of the grasping and clamping unit which has just been described will now be discussed. Prior to clamping a part 1 or 1a, the clamping unit is firstly set to its open position by supplying compressed air into annular chamber 49, the effect of which is to force pistons 45 and 48 away from each other up to their end-of-travel position where the first piston 45 abuts against its annular elastomer stop member 57 and the annular elastomer stop member 56 of the second piston 48 comes to bear against the outer edge of bearing 6a of the base 6. This extreme position of abutment is close to that shown in FIG. 1 which corresponds to a part 1 consisting, for example, of a cylindrical spectacle lens in the form of a disk having the largest admissible diameter that can be handled by the device, being clamped. Prior to clamping, clamping body 2 carried by base plate 58 advances, with arms 8 and 9 being spaced apart, in the mean plane of part 1 until the edge of part 1 comes into contact with the tangency region 13 of clamping element 10, and optionally (if additional jaws 23, 25 are present and have been set to their active position), with the tangency regions 13a, 13b of elastomer contact pads 10b, 10c of jaws 23, 25.

In order to achieve clamping, annular fluid chamber 49 is linked to the pressure release line. As long as a substantial compressed air pressure continuous to prevail in chamber 49, the return force provided by lever springs 52 is sufficient to push back the second piston 48 against the compressed air pressure thus allowing the clamping elements 11 and 12 to close against the part 1 and to bring the tangency regions 14 and 15 into contact with the cylindrical periphery of part 1 whereby the latter is prevented from escaping externally. When the excess air pressure in chamber 49 is practically no longer present, clamping spring 47 is able to push the first piston 45 back and upwardly away from the stop member 57 and complete clamping of the part at three elastic abutment regions via the elastomer contact pads provided on the jaws. Grasping of the part is subsequently achieved by displacing the base plate 58 fitted onto an operating arm, the part 1 held in position at three regions by clamping elements 10, 11, 12 being thus transported.

In order to release part 1 once it is in position, annular chamber 49 is again supplied with compressed air the effect of which is first to push back the first piston 45 against stop member 57 the part 1 being held very briefly in position only by the clamping elements 11 and 12. As the clamping provided by elements 11 and 12 is almost diametrical, the significant friction between the elastomer contact pads 31 and 32 and the cylindrical periphery of part 1 prevents this part 1 from slipping toward the clamping element 10. Very rapidly, the fluid pressure that has now increased in annular chamber 49 pushes the second piston 48 back against lever springs 52 in order to return clamping arms 33 to the unclamped position, releasing the part 1 at the required position.

The procedure for clamping a small-diameter part 1a is slightly different. First of all, the outer jaws 23 and 25 will have been set to their inactive position and, if appropriate, the intermediate jaws 24 and 26 will be set to the active position. When the grasping and clamping device which has been brought to the unclamped position by the compressed air pressure prevailing in chamber 49 advances along the mean plane of part 1a, it comes into contact with the latter in the position shown in FIG. 1. The clamping element 10 is then in a withdrawn position, as shown in FIG. 1.

During purging of the compressed air pressure prevailing in chamber 49, it is the clamping arms 33 which are the first to close until such point as the flange 41a (carrying groove 40) of sleeve 41 comes into abutment with the forward base 6 of cylinder 3. This closing position corresponds substantially to the position shown in FIG. 2. At this stage in the jaw clamping operation, the grasping and clamping elements 11 and 12 are substantially at the position shown in FIG. 2 while the grasping and clamping element 10, has, with respect to part 1a, a position as represented in FIG. 1. The part 1a is not able to escape as the jaws 11 and 12 are closed in front of it providing only a conical passage of a width less than the outer diameter of part 1a.

As the pressure in chamber 49 continues to diminish, clamping spring 47 is then able to push back the first piston 45 in order to bring push rod 18 and the clamping element 10 into the position shown in FIG. 2, after the part 1a has become engaged between the elastomer contact pads 31 and 32 which form a conical entry and has urged them back very slightly by a force amplification effect. Part 1a has now come to the position shown in FIG. 2 which, as regards the center O of disk-shaped smaller diameter part 1a, is substantially the same as that of the center of larger diameter part 1.

During release, just like for large diameter part 1, it is firstly push rod 18 which moves back, away from the part urged by the effect of the pressure on first piston 45. Part 1a is kept retained by the clamping of clamping elements 11 and 12 which operate almost diametrically, the significant friction between the elastomer contact pads 31 and 32 and the cylindrical periphery of the part 1a preventing the latter from slipping in the direction of clamping element 10. When the compressed air pressure increases in chamber 49, the reaction force of lever spring 52 is overcome by the pressure force exercised on the second piston 48, and the clamping elements 11 and 12 are brought to the unclamped position shown in FIG. 1, the center 0 of part 1a now being located, for a given position of clamping body 2, substantially at the same place as the center 0 of part 1.

For parts having a cylindrical diameter which is intermediate between that of parts 1 and 1a, it will be readily understood that during clamping, it is firstly the clamping elements 11 and 12 that close, substantially up to the position shown in FIG. 2. The part 1 is subsequently pushed back by clamping spring 47 into contact with the contact pads 31 and 32 which form an inlet conical shape. The axial thrust of clamping spring 47 is sufficient to cause clamping elements 11 and 12 to open apart due to the effect of the cone shape, until such point as practically diametrical clamping is obtained at the cylindrical periphery of part 1 at an equilibrium position, and part 1 is clamped at three points.

The parts requiring to be clamped and handled generally have a disk shape with one convex face, corresponding to a rough or machined spectacle lens. Obviously, the grasping and clamping unit according to the invention can be employed for clampingly engaging cylindrical or parallelepiped-shaped objects of relatively large length in which there is less danger of the object tipping over but where clamping of the jaws 10, 11, 12 needs to be more powerful than that obtained by the springs as shown. The release action on clamping pistons 45 and 48 which, in the case of the embodiment shown, is achieved by fluid pressure could be replaced by any other means such as electromagnetic action.

Figure 4B:
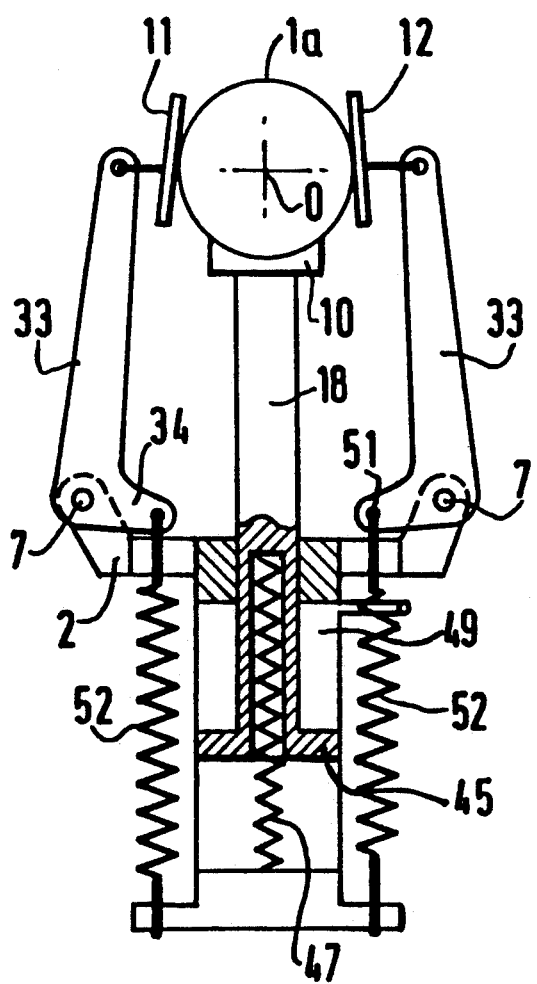

Turning now to the simplified embodiment shown in FIGS. 4a and 4b, the main parts here bear the same reference numerals as those in FIGS. 1 to 3. In the open position shown in FIG. 4a, the clamping elements of jaws 11 and 12 are moved apart by manual action, and the piston 45 is brought to its lower position by fluid pressure, for example compressed air, prevailing in the annular fluid chamber 49. Clamping is achieved firstly by progressive manual release of jaws 11 and 12 which become applied against the part 1a requiring clamping and which has been previously inserted between the jaws, thus retaining it provisionally in position despite the obtuse angle close to 180° (for example comprised between 160° and 170°) formed between the two tangential engaging faces of the jaws. In effect, as stated above, the significant friction between the elastomer contact pads of jaws 11 and 12 and the cylindrical periphery of the part 1a prevents slippage of the part in the direction of the clamping element or jaw 10.

To complete clamping, all that is required is to purge annular chamber 49, removal of pressure allowing spring 47 to urge push rod 18 and piston 45 towards the part 1a which completes three-point clamping of the part 1a which is maintained substantially centered on point 0, as already shown in FIGS. 1 and 2.

In order to provide release in the case of the simplified embodiment shown in the clamped state on FIG. 4b, annular chamber 49 is again supplied with fluid under pressure, urging piston 45 to the position shown in FIG. 4a. Part 1a is kept held in position by the jaws 11 and 12 which are carefully moved apart by manual action in order to release the part. The simplified embodiment of the grasping and clamping unit or gripper in accordance with the invention can be employed in items of equipment only requiring limited clamping forces that are compatible with what is achieved manually, and with reduced handling volumes per unit time that are compatible with partly-manual operation while taking advantage of excellent centering and "feel". It should be understood that the arrangement of clamping arms 33 shown diagramatically in FIGS. 4a and 4b is in fact identical to that of FIGS. 1 and 2, meaning that it is achieved by means of connecting rods 37 for orienting the elastomer contact pads 31 and 32 to form an obtuse angle preventing parts 1 or 1a from escaping externally.

Obviously, the present invention is not limited to the embodiments that have just been described and illustrated but may be subject to numerous variations available to those skilled in the art without this leading to a departure from the scope of the invention.

What is claimed is:

1. A unit for grasping and clamping a generally circular shaped part at three points or regions of tangential contact forming, pairwise, angles greater than 90°, comprising:
    a) a central body having a longitudinal axis;
    b) a central push rod, having first and second opposite ends, mounted on said central body for movement along said longitudinal axis;
    c) first and second levers positioned symmetrically with respect to said axis, each of said levers including a clamping arm and an operating arm, each arm having a distal end and joined together at a junction point spaced from said distal end to form an angle between the arms;
    d) means for pivotally mounting each of said levers on the central body at said junction point of the clamping and operating arms for pivoting movement between a first open position and a second clamping position, with the distal ends of the clamping arms spaced closer to said axis in said clamping position than in said open position;
    e) first, second and third grasping and clamping elements mounted on aid central body,
        1) the first of said grasping and clamping elements lying on the longitudinal axis of said central body and connected to the first end of the central push rod, and
        2) the second and third of said grasping and clamping elements being mounted symmetrically with respect to said axis, each at said distal end of one of the clamping arms of said levers;

f) at least one clamping spring engaging against said push rod and producing a reaction force urging said push rod away from the central body in the direction of said axis;

g) a first piston operatively connected to the second end of said push rod;

h) at least one lever spring connected to each of said levers for producing a reaction force urging said levers toward said second clamping position;

i) a sliding member mounted on said central body for sliding movement along said axis, said sliding member having first and second opposite ends with said first end pivotally connected to the distal end of the operating arm of each lever;

j) a second piston operatively connected to the second end of said sliding member;

k) means for urging said first piston in a direction opposing the reaction force of said clamping spring and said second piston in a direction opposing the reaction force of said lever springs; and l) the reaction force of the two lever springs applied to the levers being higher than the reaction force of said clamping spring applied to said push rod.

2. A unit for grasping and clamping a generally circular shaped part at three points or regions of tangential contact forming, pairwise, angles greater than 90°, comprising:

a) a central body having a longitudinal axis;

b) a central push rod, having first and second opposite ends, mounted on said central body for movement along said longitudinal axis;

c) first and second levers positioned symmetrically with respect to said axis, each of said levers including a clamping arm and an operating arm, each arm having a distal end and joined together at a junction point spaced from said distal end to form an angle between the arms;

d) a support shaft connected to said central body for pivotally mounting each of said levers on the central body at said junction point of the clamping and operating arms for pivoting movement between a first open position and a second clamping position, with the distal ends of the clamping arms spaced closer to said axis in said clamping position than in said open position;

e) first, second and third grasping and clamping elements mounted on said central body,
 1) the first of said grasping and clamping elements lying on the longitudinal axis of said central body and connected to the first end of the central push rod, and
 2) the second and third of said grasping and clamping elements being mounted symmetrically with respect to said axis, each at said distal end of one of the clamping arms of said levers;

f) at least one clamping spring engaging against said push rod and producing a reaction force urging said push rod away from the central body in the direction of said axis;

g) a first piston operatively connected to the second end of said push rod;

h) at least one lever spring connected to each of said levers for producing a reaction force urging said levers toward said second clamping position, with each lever spring engaging the operating arm of each lever at a position that is intermediate said junction point and the distal end of said operating arm;

i) an annular sleeve at least partially surrounding said push rod for sliding movement along said axis, said sleeve member having first and second opposite ends with a groove said first end pivotally connected to the distal end of the operating arm of each lever;

j) a second piston operatively connected to the second end of said sleeve;

k) means for urging said first piston in a direction opposing the reaction force of said clamping spring and said second piston in a direction opposing the reaction force of said lever springs; and l) the reaction force of the two lever springs applied to the levers being higher than the reaction force of said clamping spring applied to said push rod.

3. Clamping and grasping unit according to claim 2, further comprising a hollow rod member connected to the second end of said push rod and at least partially housing said clamping spring, said clamping spring consisting of a helical compression spring, one end of which bears against the central body and the other end of which bears on said push rod.

4. Clamping and grasping unit according to claim 2, wherein:

a) said central push rod includes a groove extending in the direction of said longitudinal axis; and b) a pin is carried by said annular sleeve and engages in said axial groove.

5. Clamping and grasping unit according to claim 2, wherein each lever spring is a helical traction spring, one end of which is engaged on said operating arm while the other end thereof is engaged on said central body.

6. Clamping and grasping unit according to claim 2, wherein:

a) said annular sleeve includes a cylindrical bore in which said push rod is slideably disposed in sealed relation therewith;

b) said central body includes a cylindrical bore extending in the direction of said longitudinal axis;

c) said first and second pistons are slideably mounted in said cylindrical bore in spaced relation with respect to each other and defining within said cylindrical bore between said two pistons and externally of said hollow rod, an annular fluid chamber adapted to be supplied with fluid under pressure to urge said pistons in a direction opposing the reaction forces of said clamping and lever springs.

7. Clamping and grasping unit according to claim 2, wherein each of said second and third grasping and clamping elements includes a shoe member covered with a plate of elastomer material for bearing tangentially against said part, each of said shoe members being pivotally mounted at the distal and of one of said clamping arms.

8. Clamping and grasping unit according to claim 7, further comprising a connecting rod connected to each of said shoe members, each of said rod members having opposite ends with one end pivotally connected to one of said shoe members and the other end pivotally connected to said central body for controlling the pivoting of said shoe member with respect to said clamping arm for all positions of said clamping arm.

9. Clamping and grasping unit according to claim 7, further comprising:

a) a pivoted central jaw mounted on the first end of said first clamping element;

b) a pair of inner jaws and a pair of outer jaws mounted on opposite sides of said central jaw with said inner jaws disposed between the central jaw and the outer jaws;
c) elastomer contact plates on the outer pair of jaws for tangential contact with large diameter parts to be grasped, and elastomer contact plates on the inner jaws for tangential contact with small diameter parts to be grasped; and
d) means for selectively positioning one of the pair of inner jaws and the pair of outer jaws into an operative orientation with said central jaw and the other pair out of operative orientation with said central jaw whereby said central jaw and the pair of outer jaws become applied to large diameter parts and said central jaw and the pair of inner jaws become applied to small diameter parts.

10. A unit for grasping and clamping a generally circular shaped part at three points or regions of tangential contact forming, pairwise, angles greater than 90°, comprising:
a) a central body having a longitudinal axis;
b) a central push rod, having first and second opposite ends, mounted on said central body for movement along said longitudinal axis;
c) first and second levers positioned symmetrically with respect to said axis, each of said levers including a clamping arm and an operating arm, each arm having a distal end and joined together at a junction point spaced from said distal end to form an angle between the arms;
d) means for pivotally mounting each of said levers on the central body at said junction point of the clamping and operating arms for pivoting movement between a first open position and a second clamping position, with the distal ends of the clamping arms spaced closer to said axis in said clamping position than in said open position;
e) first, second and third grasping and clamping elements mounted on said central body,
   1) the first of said grasping and clamping elements lying on the longitudinal axis of said central body and connected to the first end of the central push rod, and
   2) the second and third of said grasping and clamping elements being mounted symmetrically with respect to said axis, each at said distal end of one of the clamping arms of said levers;
f) at least one clamping spring engaging against said push rod and producing a reaction force urging said push rod away from the central body in the direction of said axis;
g) a first piston operatively connected to the second end of said push rod;
h) at least one lever spring connected to each of said levers for producing a reaction force urging said levers toward said second clamping position;
i) each of said second and third grasping and clamping elements include a shoe member for bearing tangentially against said part, each of said shoe members being pivotally mounted at the distal and of one of said clamping arms; and
j) a connecting rod connected to each of said shoe members, each of said rod members having opposite ends with one end pivotally connected to one of said shoe members and the other end pivotally connected to said central body for controlling the pivoting of said shoe member with respect to said clamping arm for all positions of said clamping arm.

* * * * *